(12) United States Patent
Stewart

(10) Patent No.: US 11,920,461 B2
(45) Date of Patent: Mar. 5, 2024

(54) DETERMINING PRESSURE IN SUBTERRANEAN FORMATIONS

(71) Applicant: Saudi Arabian Oil Company, Dhahran (SA)

(72) Inventor: Simon A. Stewart, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 305 days.

(21) Appl. No.: 17/330,006

(22) Filed: May 25, 2021

(65) Prior Publication Data

US 2022/0381136 A1    Dec. 1, 2022

(51) Int. Cl.
| | |
|---|---|
| E21B 47/06 | (2012.01) |
| E21B 47/08 | (2012.01) |
| E21B 49/08 | (2006.01) |
| G01L 9/00 | (2006.01) |

(52) U.S. Cl.
CPC .............. *E21B 47/06* (2013.01); *E21B 47/08* (2013.01); *E21B 49/0875* (2020.05); *G01L 9/0092* (2013.01); *E21B 2200/20* (2020.05); *E21B 2200/22* (2020.05)

(58) Field of Classification Search
CPC ...... E21B 47/06; E21B 49/0875; E21B 47/08; E21B 2200/20; E21B 2200/22; G01L 9/0092
See application file for complete search history.

(56) References Cited

U.S. PATENT DOCUMENTS

| | | | |
|---|---|---|---|
| 4,879,654 A * | 11/1989 | Bruce | E21B 49/006 175/48 |
| 6,446,014 B1 | 9/2002 | Ocondi | |
| 7,529,626 B1 * | 5/2009 | Ellis | G01N 33/2823 702/9 |
| 8,360,148 B2 | 1/2013 | Atwood et al. | |
| 10,370,955 B2 | 8/2019 | De Prisco | |
| 10,385,678 B2 | 8/2019 | Nguyen | |

(Continued)

FOREIGN PATENT DOCUMENTS

| | | | |
|---|---|---|---|
| GB | 24140511 A | * 12/2004 | ............. E21B 47/06 |
| WO | WO 2005051069 | 6/2005 | |

OTHER PUBLICATIONS

Wiki AAPG "Formation water density" Jul. 25, 2016, p. 1 (Year: 2016).*

(Continued)

*Primary Examiner* — Michael J Dalbo
*Assistant Examiner* — Kaleria Knox
(74) *Attorney, Agent, or Firm* — Fish & Richardson P.C.

(57) ABSTRACT

A method for determining a pressure profile in a subterranean formation is described. The method includes drilling a wellbore in the subterranean formation; lowering a logging tool into the wellbore to measure resistivity values as a function of depth along the wellbore; identifying a plurality of porous zones from the wellbore based on petrophysical logs; converting the measured resistivity values to an amount of total dissolved solids for each of the plurality of identified porous zones; converting the amount of total dissolved solids to a pore fluid density; calculating a pressure based on a sum of the pore fluid densities derived along a length of the well; and generating a depth-based pressure profile.

20 Claims, 7 Drawing Sheets
(1 of 7 Drawing Sheet(s) Filed in Color)

(56) References Cited

U.S. PATENT DOCUMENTS

2010/0000791 A1* 1/2010 Alberty .................... G01V 3/20
175/45
2013/0066558 A1* 3/2013 Wessling ................. G01V 9/00
702/9

OTHER PUBLICATIONS

Archie "the electrical resistivity Log as an Aid in determining some reservoir characteristics" (Year: 1941).*
Beaumont "Formation Fluid Pressure and ITs Application" Chapter 5, pp. 5-1/5-64 (Year: 1999).*
"Fluid overpressures and strength of the sedimentary upper crust" John Suppe, pp. 481-492, Journal of Stractural Geology (Year: 2014).*
"Effect of total dissolved solids-contaminated water on the properties of concrete". Mohammed Hamdan, pp. 1-9 (Year: 2020).*
Croskrey et al., "Utilizing resistivity logs and the Rwa method to map salinity zones in the Eocene Queen City Aquifer, central Texas", pp. 1-24 (Year: 2019).*
Wiki AAPG "Pickett plot construction" Jun. 20, 2017, p. 1-2 (Year: 2017).*
Archie, "The electrical resistivity log as an aid in determining some reservoir characteristics." Transactions of the AIME 146.01, Dec. 1942, 54-62, 9 pages.
Atashbari et al., "Pore pressure prediction in carbonate reservoirs." SPE Latin America and Caribbean petroleum engineering conference. OnePetro, Apr. 2012, 20 pages.
Beaumont et al., "Treatise of Petroleum Geology/Handbook of Petroleum Geology: Exploring for Oil and Gas Traps. Chapter 5: Formation Fluid Pressure and Its Application." 1999, 64 pages.

Bowers, "Detecting high overpressure." The leading edge 21.2 Feb. 2002, 174-177, 4 pages.
Bradley et al., "Properties of produced waters." Petroleum Engineering Handbook, 1987, 25 pages.
Dickey, "Increasing concentration of subsurface brines with depth." Chemical Geology 4.1-2, Mar. 1969, 361-370, 10 pages.
Finkbeiner et al., "Stress, pore pressure, and dynamically constrained hydrocarbon columns in the South Eugene Island 330 field, northern Gulf of Mexico." AAPG bulletin 85.6, Jun. 2001, 1007-1031, 25 pages.
Li et al., "Anomalous Pore Pressure and its Relation with In-Situ Stress Regime in Deepwater Play." SPE Annual Technical Conference and Exhibition. OnePetro, Oct. 2011, 6 pages.
Powley, "Pressures and hydrogeology in petroleum basins." Earth-Science Reviews 29.1-4, Oct. 1990, 215-226, 12 pages.
Suppe, "Fluid overpressures and strength of the sedimentary upper crust." Journal of Structural Geology 69, Dec. 2014, 481-492, 12 pages.
Traugott, "Pore/fracture pressure determinations in deep water." World Oil 218.8, 1997, 68-70, 8 pages.
Yardley et al., "Lateral transfer: A source of additional overpressure?." Marine and Petroleum Geology 17.4, Apr. 2000, 523-537, 15 pages.
Zhang et al., "Real-time pore pressure detection: indicators and improved methods." Geofluids, Jan. 2017, 12 pages.
Zhang, "Effective stress, porosity, velocity and abnormal pore pressure prediction accounting for compaction disequilibrium and unloading." Marine and Petroleum Geology 45, Aug. 2013, 2-11, 10 pages.
Zhang, "Pore pressure prediction from well logs: Methods, modifications, and new approaches." Earth-Science Reviews 108.1-2, Sep. 2011, 33 pages.

* cited by examiner

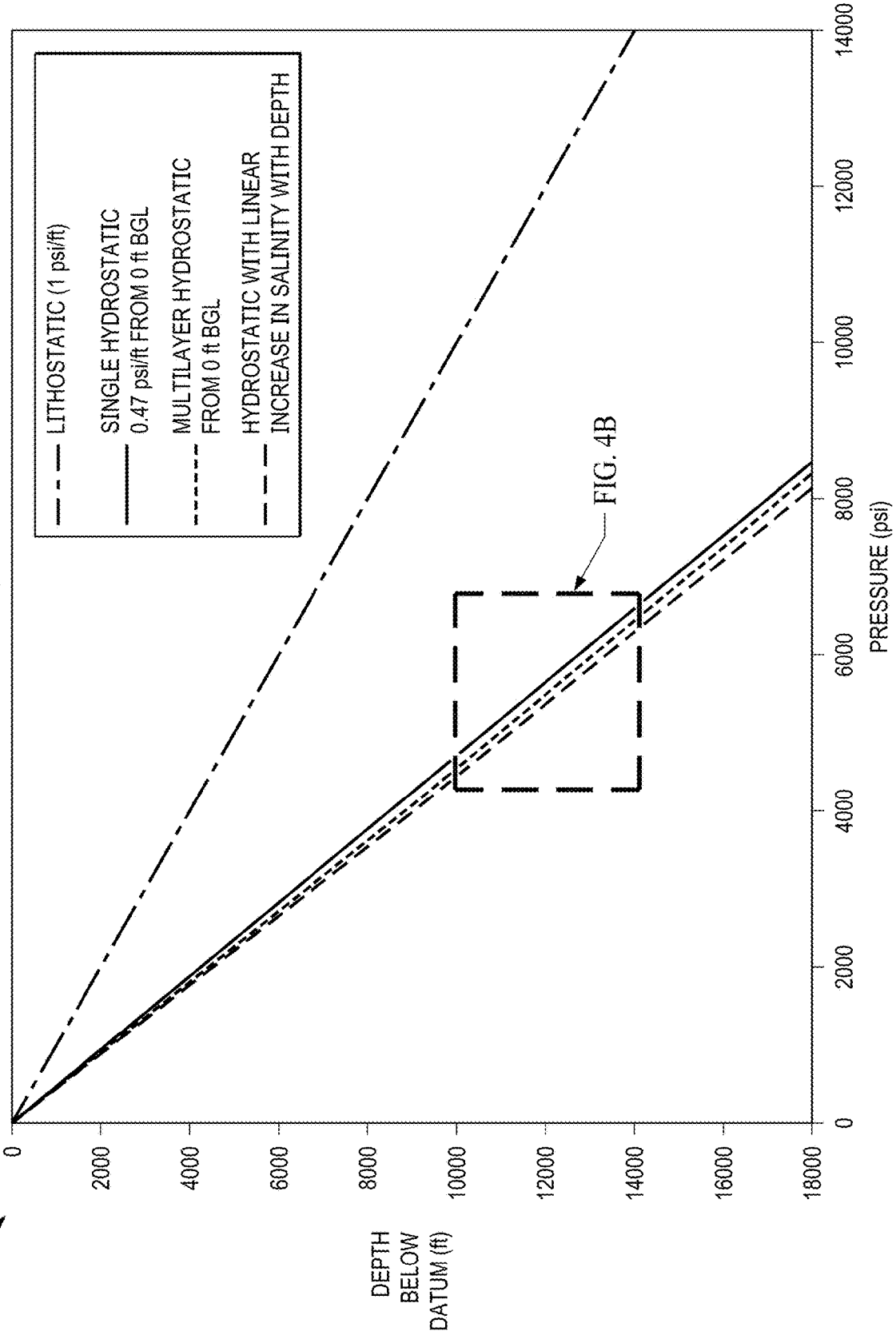

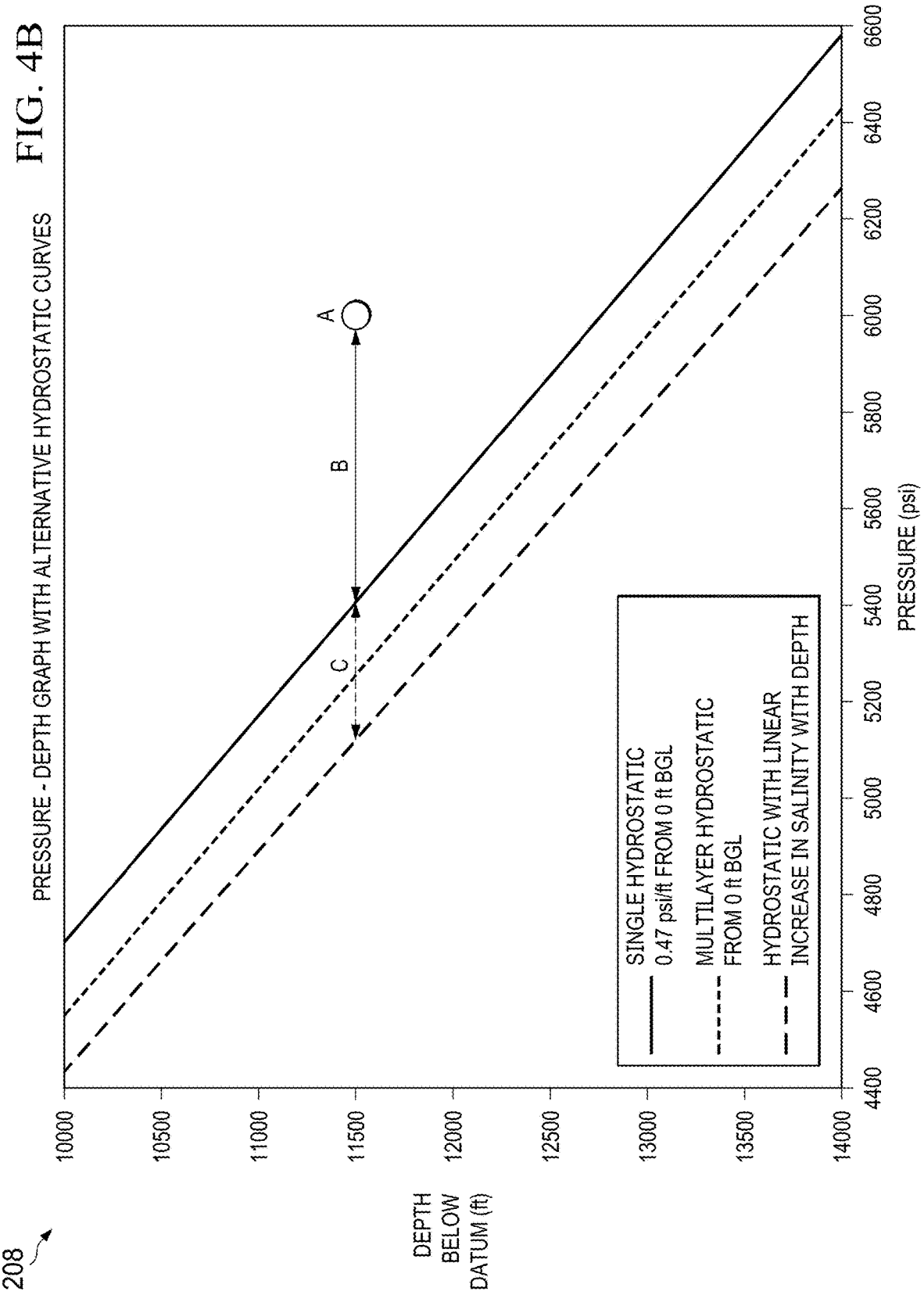

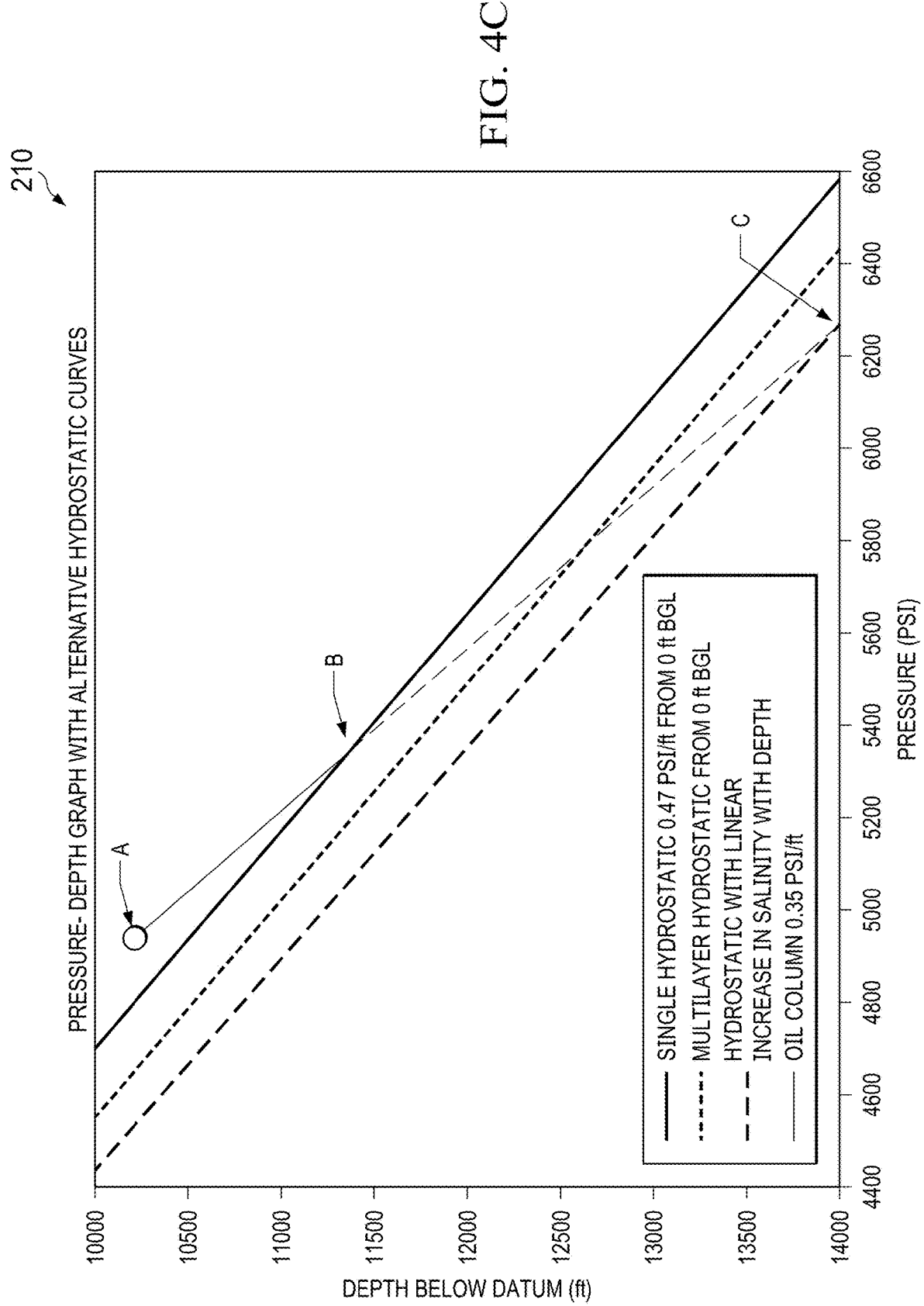

DETERMINING PRESSURE IN SUBTERRANEAN FORMATIONS

TECHNICAL FIELD

The present disclosure generally relates to methods for determining pressure, more particularly methods for determining hydrostatic pressure in subterranean formations.

BACKGROUND

In onshore wells below the water table, and below sea level in offshore wells, the rock pores are saturated with water. The pressure in the water-filled pores, also called a hydrostatic (i.e., baseline) pressure, is defined as if there is no influence of pressure from other sources except the weight of the water present in the pores.

Existing approaches calculate the hydrostatic pressure by the weight of a water column from a measured point in the subsurface, vertically upwards to a reference datum, without detailed reference to the fluid density variation in the wellbore. The reference datum is a mean sea level for offshore wells and is the water table at the well location in onshore wells. The measured pressure of the subsurface water or hydrocarbons can differ from the expected hydrostatic pressure. For example, in the case of hydrocarbons, the difference between the hydrocarbon and the pore water density gives rise to a "buoyancy overpressure" which is proportional to the difference in density and the hydrocarbon column height.

SUMMARY

This specification describes systems and methods for accurately determining a baseline pressure of pore zones (e.g., a zone with porosity in the well defined in terms of vertical depth or depth range) in drilled wells. This approach takes in consideration the detailed variation of pore fluid density along the length of the wellbore as determined by all available data. Specifically, electric logs, pressure, and sample data. The method allows accurate characterization of anomalies, such as pressure of found hydrocarbons, to characterize various pore zones in terms of the "overpressure" such as the difference between measured pressure at a given depth and the predicted baseline pressure for that depth. For example, the pore zones can be characterized for inferred hydrocarbon volume and commerciality. The described approach uses available water salinity information of pore zones collected throughout the drilled well. The pore zones are identified from well logs with qualifying criteria. To construct a salinity profile, the collected resistivity data through the drilled well is converted to a hydrostatic pore fluid density profile tailored to the specific well location. This approach derives a hydrostatic pressure along the drilled well using the pore fluid density profile. The profile can be also constrained by a pressure gradient and direct fluid sample information in the wellbore. The approach allows the process to be automated.

This approach accurately determines the pore water baseline pressure in drilled wells. This allows the measured pressure values in the subsurface to be quantified in terms of over-pressure or under-pressure relative to an unperturbed baseline pressure. This quantification of over- or under-pressure enhances the commercial and technical analysis of pore fluid pressure information.

In some aspects, a method for determining a pressure profile in a subterranean formation includes drilling a wellbore in the subterranean formation; lowering a logging tool into the wellbore to measure resistivity values as a function of depth along the wellbore; identifying a plurality of porous zones from the wellbore based on petrophysical logs; converting the measured resistivity values to an amount of total dissolved solids for each of the plurality of identified porous zones; converting the amount of total dissolved solids to a pore fluid density; calculating a pressure based on a sum of the pore fluid densities derived along a length of the well; and generating a depth-based pressure profile.

In some aspects, a method for determining a pressure profile in a subterranean formation includes identifying a plurality of porous zones from the wellbore based on petrophysical logs; converting the measured resistivity values to an amount of total dissolved solids for each of the plurality of identified porous zones; converting the amount of total dissolved solids to a pore fluid density; calculating a pressure based on a sum of the pore fluid densities derived along a length of the well; and generating a depth-based pressure profile.

Embodiments of the method for determining a pressure profile in a subterranean formation can include one or more of the following features.

In some embodiments, the method includes identifying the plurality of porous zones further includes characterizing each identified porous zone based on a porosity amount and a tolerable hole condition. In some cases, the method includes characterizing each identified porous zone is based on the porosity amount of more than 5%. In some cases, the method includes characterizing each identified porous zone is based on the tolerable hole condition between 0 and 40 percent hole enlargement using a caliper log measurement of a hole diameter.

In some embodiments, the method includes converting the measured resistivity values to salinity values for each of the plurality of identified porous zones and transforming resistivity logs to formation water salinity values using Pickett plots. In some cases, transforming includes the Pickett plots being part of the transform process from the resistivity logs to the pore fluid density. In some cases, the method includes calibrating the transformed resistivity logs to the pore fluid density using available pressure gradients or fluid sample analysis.

In some embodiments, the method converting the amount of total dissolved solids to a pore fluid density profile and calculating using an analytical model. In some cases, analytical model includes a density (g/cubic cm)=1+TDS (ppm) *6.95E-07.

In some embodiments, the method includes generating an accurate estimate of over-pressure or under-pressure for a drilled well.

This approach relates the collected resistivity data and other data available from the drilled well that can constrain the water properties (e.g., fluid sample analyses or density derived from pore pressure gradients) to accurately interpret the pressure in the well. The described methods can be applied to a variety of exploration wells, particularly where the hydrostatic baseline pressure and other phenomena, such as hydrocarbon column heights, may be uncertain or unknown.

These methods can eliminate the challenge of determining how much over- or under-pressure should be interpreted from a given pressure measurement, irrespective of the composition of the measured fluid or the hydrocarbon column height.

The described methods do not rely on established rule of thumb or assumptions about what a representative single (e.g., average), or function-based pore fluid density should be. Instead, the described methods use available wireline log data from a drilled well to determine an accurate hydrostatic pressure with respect to each depth in the well. The methods transform the measured resistivity to the Total Dissolved Solids (TDS), and hence a pore fluid density of the formation along the length of the wellbore to the pressure in the well. The methods use direct information along the full length of the drilled well to accurately determine hydrostatic pressure. Direct utilization of actual pressure measurements in the drilled well or adjacent wells can be technically circular approach because the relationship between the measured pressure in the local area and the actual hydrostatic is the unknown. The described methods establishes a locally accurate hydrostatic gradient without using general assumptions.

The Total Dissolved Solids (TDS) refers to ionic species that can contribute to pore fluid density. For example, the ionic species can include Na, Cl, Ca, Mg, CO3, HCO3, and SO4. Na and Cl are usually predominant, including between 40% and 90% of the TDS. In some examples, salinity refers specifically to NaCl ions or salinity is synonymous with TDS. In the described method, salinity is referred as TDS. This recognizes that the relationship between TDS and resistivity log measurements can carry a level of uncertainty if the ionic composition of pore water is unavailable. For example, when no samples are available in the region, or if there are no pore fluid pressure measurements that can constrain pore fluid pressure gradient. In another example, density and pore fluid pressure gradient are related using the relationship density (g/cc)=pore fluid pressure gradient (psi/ft)*0.433. These terms can be used interchangeably on this basis.

The details of one or more embodiments of these methods are set forth in the accompanying drawings and the description below. Other features, objects, and advantages of these methods will be apparent from the description and drawings and from the claims.

DESCRIPTION OF DRAWINGS

The patent or application file contains at least one drawing executed in color. Copies of this patent or patent application publication with color drawing(s) will be provided by the Office upon request and payment of the necessary fee.

FIGS. 4A-4C are examples of different versions of hydrostatic pressure curves at different depths in the wellbore.

DETAILED DESCRIPTION

This specification describes systems and methods for accurately determining a baseline pressure of pore zones in drilled wells. This approach takes in consideration anomalies, such as pressure of found hydrocarbons, to characterize various pore zones. For example, the pore zones can be characterized for inferred hydrocarbon volume and commerciality. The described approach uses available water salinity information of pore zones collected throughout the drilled well. The pore zones are identified from well logs with qualifying criteria. To construct a salinity profile, the collected resistivity data through the drilled well is converted to a hydrostatic pore fluid density profile tailored to the specific well location. The water column is modelled from the water table depth (e.g., in onshore wells) or sea level (e.g., in offshore wells). Constraint on water table depth is a key element of accuracy in the method. If not established in the main well itself, water table depth can be established from locally-drilled water wells, which may be drilled to provide water for the mud system in the deep subject well. This approach derives a hydrostatic pressure along the drilled well using the pore fluid density profile. The approach allows the process to be automated.

This approach accurately determines the pore water baseline pressure in drilled wells. This allows the measured pressure values in the subsurface to be quantified in terms of over-pressure or under-pressure relative to an unperturbed event. This quantification of over- or under-pressure enhances the commercial and technical analysis of pore fluid pressure information.

Figure 1:
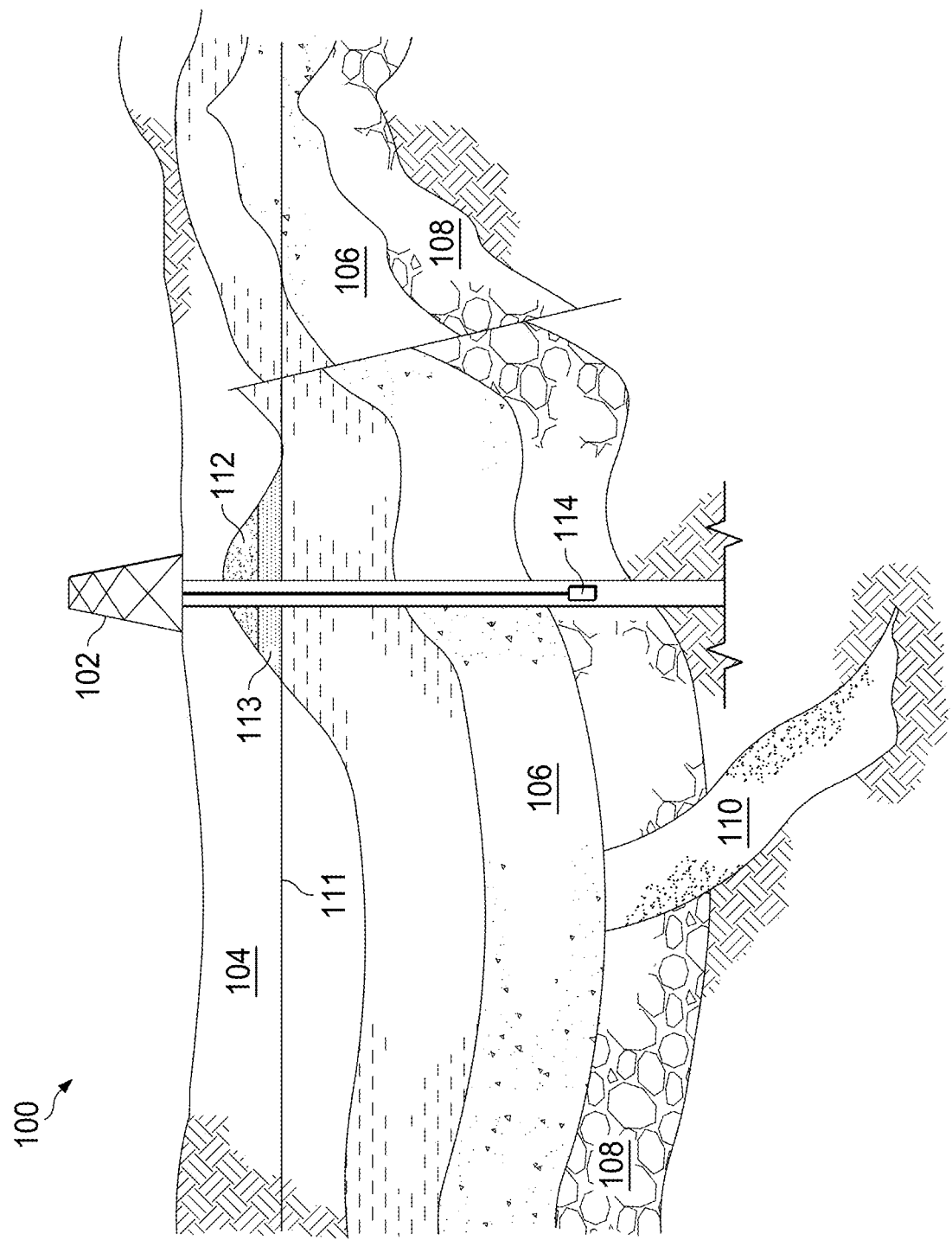
FIG. 1 is a schematic view of a wellbore with deployed logging tool.

FIG. 1 is a schematic view of a wellbore 100. A logging tool 114 is deployed in the wellbore 100. The subterranean formation includes multiple geological layers and regions 104, 106, 108, 110, 112, 113. As previously discussed, at various depths below the water table 111 in onshore wells, and below sea level in offshore wells, the pores in the geological layers are filled with water or other fluids. The water filled pores experience a hydrostatic pressure. The hydrostatic pressure is expected to be the pressure if there is no influence on the pores from other layers or regions in the subterranean formation except the weight of the water vertically above that point in the well. However, the content of the geological layers and regions 104, 106, 108, 110, 112, 113 in the wellbore 100 can cause the measured pressure from the subsurface water or hydrocarbons to differ from the expected hydrostatic pressure, for example, if low permeability zones have prevented fluids from depressurizing during eons of geological burial and rock compaction. Therefore, accurate determination of the pressure at different depths of the wellbore 100 plays a role in determining the commerciality of the well investment and the amount of discovered hydrocarbons, as well as subsurface characterization for other applications such as CO2 sequestration.

Figure 2:
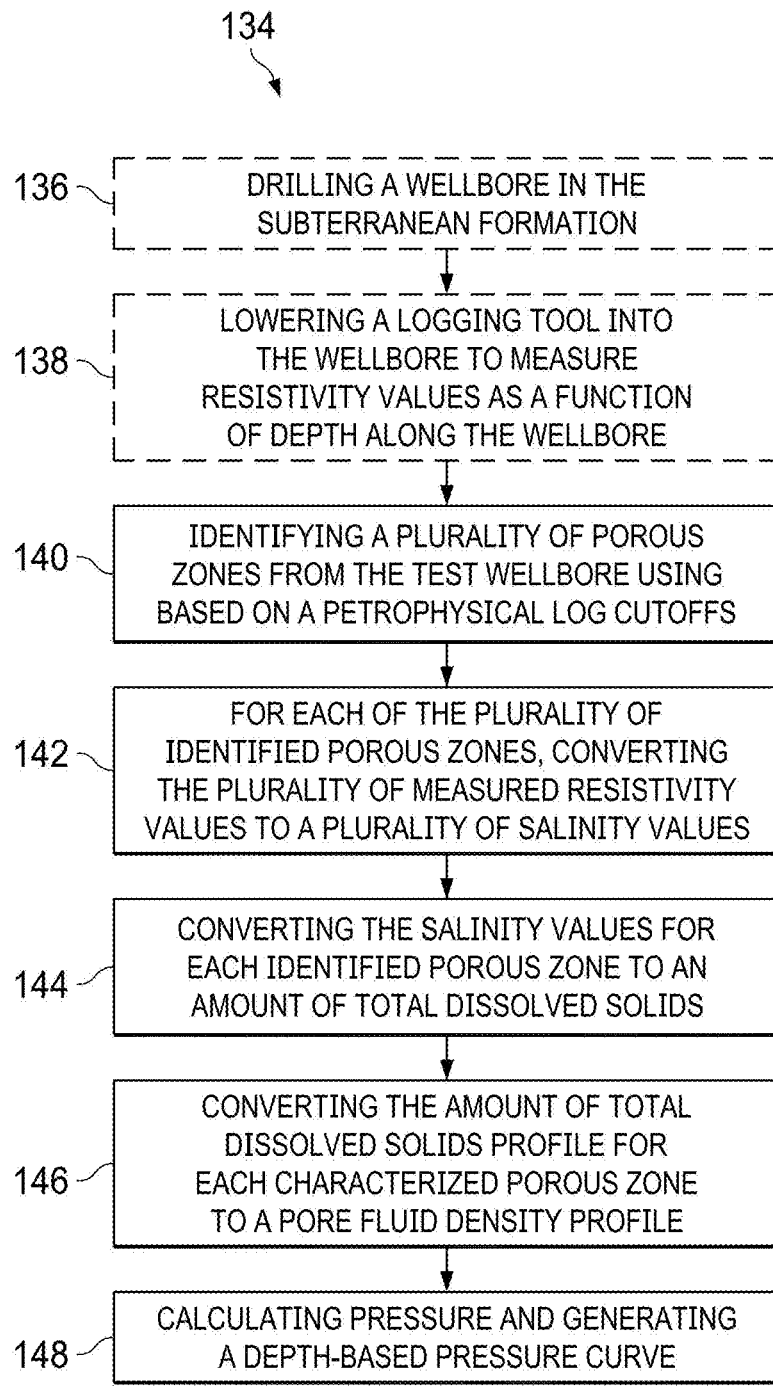
FIG. 2 is a flowchart representing a method for determining pressure at different depths in the wellbore.

FIG. 2 is a flowchart representing a method 134 for determining pressure at different depths in the wellbore 100. The following discussion of the method describes the steps with reference to the wellbore 100. In some implementations, the well can be a well planned for near future, a drilled well, or already drilled well.

In general, the pressure in a fluid at a depth can be calculated using Equation 1:

$$p = \rho g h \quad (1)$$

where $\rho$ is a density of liquid, g is gravity, and h is the height or thickness of a liquid column. The equation 1 indicates that an accurate prediction of pressure can be obtained by incorporating the fluid density over a depth range when the fluid density varies with respect to depth. In this implementation, equation 1 is integrated across the depth range from the water table to a given depth h, taking into account variable fluid density with depth. In application, the fluid density of a subsurface water is not constant over the entire depth of the drilled well. The reason for the variation in fluid density with respect to depth is the changing amount of total dissolved solids (TDS). The amount of TDS generally increases with respect to depth. For example, the amount of TDS is generally low at shallow depths (e.g., near the surface). In other examples, the amount of TDS can reach values between 100,000 ppm and 300,000 ppm (hypersaline) at depths of several thousand feet. The exact nature of this density profile depends on a variety of factors and can be challenging to accurately predict.

The method 134 is based on an approach to estimate a baseline pore pressure in drilled wells where anomalies (e.g., pressure of found hydrocarbons) can be correctly analyzed for additional characterization. The described method uses available pore water salinity information collected at identified pore zones throughout the drilled well.

In some implementations, the method 134 includes drilling a wellbore in the subterranean formation (step 136). Either during drilling or after drilling, logging is performed to measure resistivity along the wellbore. For example, a logging tool 114 is lowered into the wellbore 100 to measure resistivity values along different depths in the wellbore (step 138). The method uses logs acquired in wells to create a pore fluid density log for the entire well that can be integrated to yield hydrostatic pressure at different depths. The method identifies porous zones that satisfy the petrophysical cutoffs in terms of the log quality criteria (e.g., zones that lack anomalous hole size problems that can compromise the interpretation of zone properties) and amount of porosity (step 140).

The resistivity data along the wellbore is transformed to TDS values of the fluid in the pores (step 142). The transformation step can be conducted using the Pickett plots approach described in "Predicting reservoir system quality and performance" by Dan J. Hartmann and Edward A. Beaumont, *Treatise of Petroleum Geology/Handbook of Petroleum Geology: Exploring for Oil and Gas Traps*. (1999), incorporated in this disclosure in its entirety by reference. For the most accurate results, this transformation should accommodate what is known about the ionic composition of the fluid, for instance the proportion of ionic species represented by Na and Cl, which are usually predominant. Accommodation should also be made for conductivity of clay that may be present within the rock mass surrounding the pores, or may line the pores to some degree. Calibration can be performed if pressure gradient or ionic compositions are available from pressure and sample data, which may exist in the well (step 144)

The amounts of TDS can be used to generate a pore fluid density profile (step 146). For example, the amounts of TDS can be used to generate the pore density profile by the approach described in "Formation fluid pressure and its application" by Beaumont and Fiedler, *Exploring for Oil and Gas Traps* (1999), incorporated in this disclosure in its entirety by reference. The conversion can be calculated from the amounts of TDS using an expression such as Equation 2:

$$\text{density(g/cubic cm)} = 1 + \text{TDS(ppm)} \ast 6.95E\text{-}07 \quad (2)$$

The calculations are performed for the entire well, in the identified porosity zones that meet the pore quality and thickness criteria, as described earlier. The calculated densities using equation 2 are integrated along the length of the well to construct a hydrostatic pressure curve for the drilled well (step 148).

Figure 3:
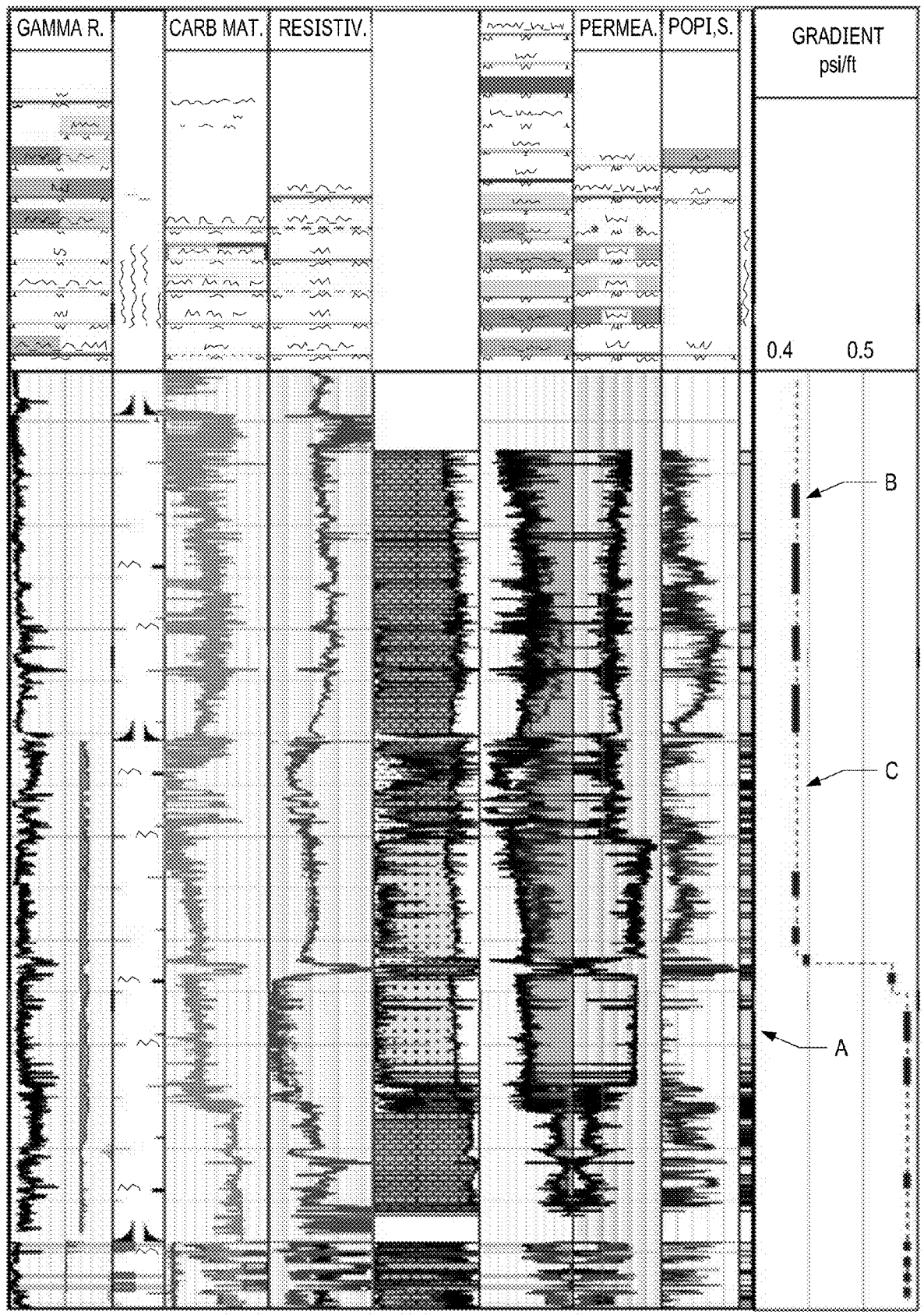
FIG. 3 is an example well log from the drilled wellbore.

FIG. 3 is an example well log 168 collected from the drilled wellbore 100. As illustrated, the pore fluid density is derived using collected data from the wellbore at different depths. Variety of pore zones are identified based on porosity (e.g., zones that have porosity greater than 5%) and tolerable hole condition (e.g. deep resistivity log information, as required in this technique, will become unreliable if the hole diameter is greater than approximately 40% of the hole size specified by the drilling assembly). As illustrated, the identified pore zones are marked as (A) and are characterized using a resistivity log presented with a red curve in example 168. The resistivity values are converted to pore fluid gradient profile identified as (B). The derived pore fluid gradient values are interpolated into a pressure gradient log identified as (C). Pore fluid density (g/cc) can be calculated from gradient (psi/ft) by dividing the gradient by 0.433.

Determining hydrocarbon column height, or depth from the measured point to the contact between the hydrocarbons and the fully water-saturated pores, is a crucial parameter. This helps to determine the amount of discovered hydrocarbons and the commerciality of the well investment. In some examples, the water in the pores can be measured at significantly higher (i.e., over-pressured) or lower (i.e., under-pressured) values than those expected in a hydrostatic situation. These methods and related values rely on accurate prediction of the reference hydrostatic pressure for a specific location and depth in the well. The described method can eliminate the need to rely on assumptions that over-simplify the derivation of the hydrostatic pressure profiles for the drilled wells. The described method significantly reduces inaccuracies in the absolute over- or under-pressure measurements for various wells when relying on assumptions.

FIGS. 4A-4C are examples 188, 208, 210 of different versions of hydrostatic pressure curves at different depths in the wellbore. As illustrated, a pressure versus depth plot shows distribution of three versions of hydrostatic subsurface pressure. The line marked as "multilayer hydrostatic" is generated using the described method 134. The line marked as "single" hydrostatic is generated using a constant gradient of 0.47 psi/ft as can be observed at a specific wellbore depth. The line marked as "linear increase in salinity" represents variation in pore fluid density modelled by a mathematical function, for instance a linear increase in pore water fluid density as a function of depth. As with typical hydrostatic line, the multilayer hydrostatic line should begin with a value of zero at the appropriate datum since gauge pressure is the one taken in consideration instead of the absolute pressure. The datum can represent the mean sea level for offshore wells or the locally measured water table depth in onshore wells. In this example, a nominal datum is used that can represent either situation. The measured pressure in the drilled well is referenced to the shown curve for improved estimate of over- or under-pressure. FIG. 4B also illustrates that the measured pressure at a given point (A) in the well is used together with the hydrostatic pressure to output an over-pressure estimate, due to the buoyancy force from the hydrocarbons. However, the amount of the assumed over-pressure can vary from point (B) to point (B+C) based on which hydrostatic line is used. The range (C) is shown as 300 psi which is large. In other examples, the range can be smaller or bigger than 300 psi. In some implementations, as illustrated in FIG. 4C, a measured pressure point (A) is associated with an oil sample that has a yielded oil density of 0.35 psi/feet. In the absence of any other information near the well on the depth of the oil-water contact, the oil column height (e.g., mapped volume of discovered hydrocarbons) varies between 1050 feet (points B to A) to 3650 feet (points C to A) depending on which hydrostatic line is used.

In application, this uncertainty in size of discovered volume of hydrocarbons can be overcome by intentionally drilling a deeper well to establish the presence and pressure of water in the same reservoir that contains the hydrocarbons. That entails commitment of capital cost for the new "delineation" well, and involves a risk that the delineation well will not be optimally located, possibly necessitating an additional delineation well. The described approach allows generating accurate baseline of hydrostatic values for a given well, using water salinity information available from the same well and supplemented by additional subsurface information. This approach can increase the accuracy and confidence in the quantitative over- and under-pressure measurements and subsequent well characterizations. For example, as illustrated in FIGS. 4A-4B, the discovered hydrocarbons approach can lead to an accurate preliminary estimate of possible hydrocarbon column height that does not remove the requirement to drill and prove the depth of water. The described approach can positively influence the commerciality of the information and the placement of the water zone delineation well.

Figure 5:
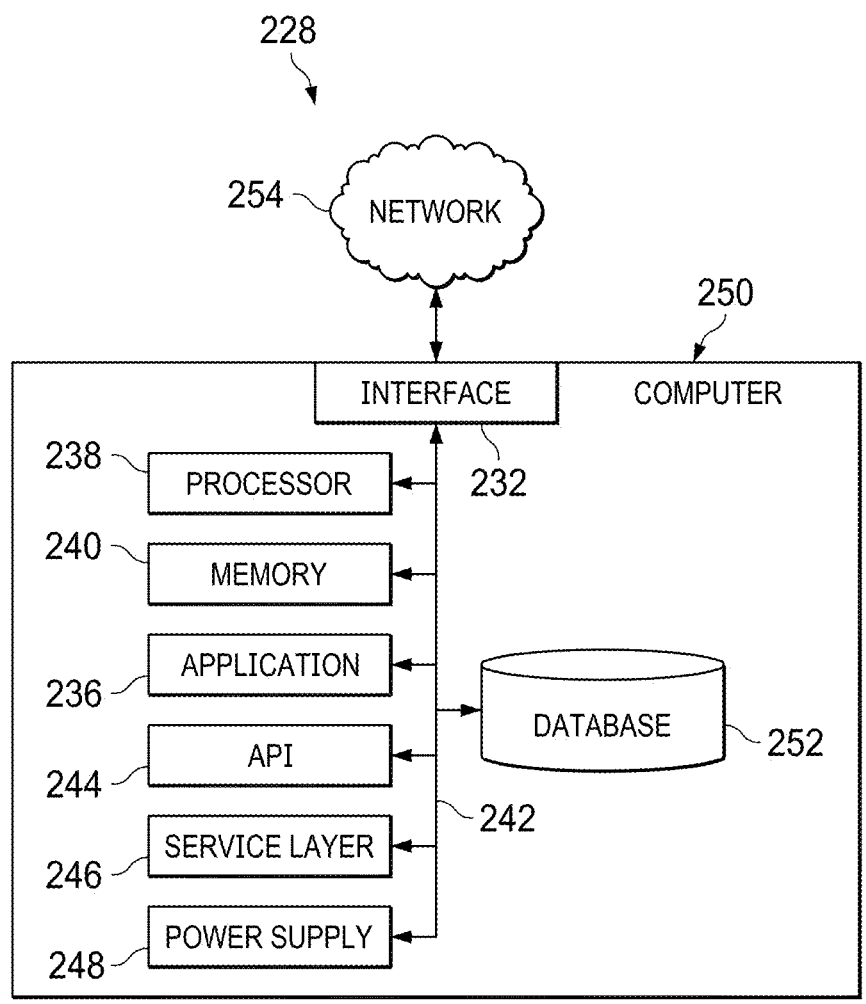
FIG. 5 is a block diagram of an example computer system.

FIG. 5 is a block diagram of an example computer system 250 used to provide computational functionalities associated with described algorithms, methods, functions, processes, flows, and procedures described in the present disclosure, according to some implementations of the present disclosure. The illustrated computer 250 is intended to encompass any computing device such as a server, a desktop computer, a laptop/notebook computer, a wireless data port, a smartphone, a personal data assistant (PDA), a tablet computing device, or one or more processors within these devices, including physical instances, virtual instances, or both. The computer 250 can include input devices such as keypads, keyboards, and touch screens that can accept user information. Also, the computer 250 can include output devices that can convey information associated with the operation of the computer 250 The information can include digital data, visual data, audio information, or a combination of information. The information can be presented in a graphical user interface (UI) (or GUI).

The computer 250 can serve in a role as a client, a network component, a server, a database, a persistency, or components of a computer system for performing the subject matter described in the present disclosure. The illustrated computer 250 is communicably coupled with a network 254. In some implementations, one or more components of the computer 250 can be configured to operate within different environments, including cloud-computing-based environments, local environments, global environments, and combinations of environments.

At a high level, the computer 250 is an electronic computing device operable to receive, transmit, process, store, and manage data and information associated with the described subject matter. According to some implementations, the computer 250 can also include, or be communicably coupled with, an application server, an email server, a web server, a caching server, a streaming data server, or a combination of servers.

The computer 250 can receive requests over network 254 from a client application (for example, executing on another computer 250). The computer 250 can respond to the received requests by processing the received requests using software applications. Requests can also be sent to the computer 250 from internal users (for example, from a command console), external (or third) parties, automated applications, entities, individuals, systems, and computers. Each of the components of the computer 250 can communicate using a system bus 564. In some implementations, any or all of the components of the computer 250, including hardware or software components, can interface with each other or the interface 232 (or a combination of both), over the system bus 564. Interfaces can use an application programming interface (API) 244, a service layer 246, or a combination of the API 244 and service layer 246. The API 244 can include specifications for routines, data structures, and object classes. The API 244 can be either computer-language independent or dependent. The API 244 can refer to a complete interface, a single function, or a set of APIs.

The service layer 246 can provide software services to the computer 250 and other components (whether illustrated or not) that are communicably coupled to the computer 250. The functionality of the computer 250 can be accessible for all service consumers using this service layer. Software services, such as those provided by the service layer 246, can provide reusable, defined functionalities through a defined interface. For example, the interface can be software written in JAVA, C++, or a language providing data in extensible markup language (XML) format. While illustrated as an integrated component of the computer 250, in alternative implementations, the API 244 or the service layer 246 can be stand-alone components in relation to other components of the computer 250 and other components communicably coupled to the computer 250. Moreover, any or all parts of the API 244 or the service layer 246 can be implemented as child or sub-modules of another software module, enterprise application, or hardware module without departing from the scope of the present disclosure.

The computer 250 includes an interface 232. Although illustrated as a single interface 232 in FIG. 5, two or more interfaces 232 can be used according to particular needs, desires, or particular implementations of the computer 250 and the described functionality. The interface 232 can be used by the computer 250 for communicating with other systems that are connected to the network 254 (whether illustrated or not) in a distributed environment. Generally, the interface 232 can include, or be implemented using, logic encoded in software or hardware (or a combination of software and hardware) operable to communicate with the network 254. More specifically, the interface 232 can include software supporting one or more communication protocols associated with communications. As such, the network 254 or the interface's hardware can be operable to communicate physical signals within and outside of the illustrated computer 250.

The computer 250 includes a processor 238. Although illustrated as a single processor 238 in FIG. 5, two or more processors 238 can be used according to particular needs, desires, or particular implementations of the computer 250 and the described functionality. Generally, the processor 238 can execute instructions and can manipulate data to perform the operations of the computer 250, including operations using algorithms, methods, functions, processes, flows, and procedures as described in the present disclosure.

The computer 250 also includes a database 252 that can hold data for the computer 250 and other components connected to the network 254 (whether illustrated or not). For example, database 252 can be an in-memory, conventional, or a database storing data consistent with the present disclosure. In some implementations, database 252 can be a combination of two or more different database types (for example, hybrid in-memory and conventional databases) according to particular needs, desires, or particular implementations of the computer 250 and the described functionality. Although illustrated as a single database 252 in FIG. 5, two or more databases (of the same, different, or combination of types) can be used according to particular needs, desires, or particular implementations of the computer 250 and the described functionality. While database 252 is illustrated as an internal component of the computer 250, in alternative implementations, database 252 can be external to the computer 250.

The computer 250 also includes a memory 240 that can hold data for the computer 250 or a combination of components connected to the network 254 (whether illustrated or not). Memory 240 can store any data consistent with the present disclosure. In some implementations, memory 240 can be a combination of two or more different types of memory (for example, a combination of semiconductor and magnetic storage) according to particular needs, desires, or particular implementations of the computer 250 and the described functionality. Although illustrated as a single memory 240 in FIG. 5, two or more memories 240 (of the same, different, or combination of types) can be used according to particular needs, desires, or particular implementations of the computer 250 and the described functionality. While memory 240 is illustrated as an internal component of the computer 250, in alternative implementations, memory 240 can be external to the computer 250.

The application 236 can be an algorithmic software engine providing functionality according to particular needs, desires, or particular implementations of the computer 250 and the described functionality. For example, application 236 can serve as one or more components, modules, or applications. Further, although illustrated as a single application 236, the application 236 can be implemented as multiple applications 236 on the computer 250. In addition, although illustrated as internal to the computer 250, in alternative implementations, the application 236 can be external to the computer 250.

The computer 250 can also include a power supply 248. The power supply 248 can include a rechargeable or non-rechargeable battery that can be configured to be either user- or non-user-replaceable. In some implementations, the power supply 248 can include power-conversion and management circuits, including recharging, standby, and power management functionalities. In some implementations, the power-supply 248 can include a power plug to allow the computer 250 to be plugged into a wall socket or a power source to, for example, power the computer 250 or recharge a rechargeable battery.

There can be any number of computers 250 associated with, or external to, a computer system containing computer 250, with each computer 250 communicating over network 254. Further, the terms "client," "user," and other appropriate terminology can be used interchangeably, as appropriate, without departing from the scope of the present disclosure. Moreover, the present disclosure contemplates that many users can use one computer 250 and one user can use multiple computers 250.

Implementations of the subject matter and the functional operations described in this specification can be implemented in digital electronic circuitry, intangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially-generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A method for determining a pressure profile in a subterranean formation, the method comprising:
   drilling a wellbore in the subterranean formation;
   lowering a logging tool into the wellbore to measure resistivity values as a function of depth along the wellbore;
   identifying a plurality of porous zones from the wellbore based on petrophysical logs, wherein identifying the plurality of porous zones further comprises characterizing each identified porous zone based on a porosity amount and a tolerable hole condition;
   converting the measured resistivity values to an amount of total dissolved solids for each of the plurality of porous zones;
   converting the amount of total dissolved solids to a pore fluid density;
   calculating a pressure based on a sum of the pore fluid densities derived along a length of the well; and
   generating a depth-based pressure profile.

2. The method of claim 1, wherein characterizing each identified porous zone is based on the porosity amount of more than 5%.

3. The method of claim 1, wherein characterizing each identified porous zone is based on the tolerable hole condition between 0 and 40 percent hole enlargement using a caliper log measurement of a hole diameter.

4. The method of claim 1, wherein converting the measured resistivity values to salinity values for each of the plurality of porous zones further comprises transforming resistivity logs to formation water salinity values using Pickett plots.

5. The method of claim 4, wherein transforming comprises the Pickett plots being part of the transform process from the resistivity logs to the pore fluid density.

6. The method of claim 5, wherein the transforming further comprises calibrating the transformed resistivity logs to the pore fluid density using available pressure gradients or fluid sample analysis.

7. The method of claim 1, wherein converting the amount of total dissolved solids to a pore fluid density profile further comprises calculating using an analytical model.

8. The method of claim 7, wherein calculating using an analytical model includes a density (g/cubic cm)=1+TDS (ppm)*6.95E-07.

9. The method of claim 1, wherein generating the pressure profile further comprises generating an estimate of over-pressure or under-pressure for a drilled well.

10. The method of claim 1, wherein converting the measured resistivity values to the amount of total dissolved solids for each of the plurality of porous zones comprises adjusting the resistivity values based on a conductivity of clay present in fluid in the subterranean formation.

11. The method of claim 1, wherein converting the amount of total dissolved solids to a pore fluid density profile further comprises adjusting the amount of total dissolved solids based on an ionic composition of fluid in the subterranean formation.

12. A system for determining a pressure profile of a wellbore, the system comprising:
   a logging tool configured to be deployed in a wellbore to measure resistivity values as a function of depth along the wellbore; and
   a computer configured to perform operations comprising:
      receiving data comprising the resistivity values as the function of depth along the wellbore from the logging tool;
      identifying a plurality of porous zones from the wellbore based on petrophysical logs by characterizing each identified porous zone based on a porosity amount and a tolerable hole condition;
      converting the measured resistivity values to an amount of total dissolved solids for each of the plurality of porous zones;
      converting the amount of total dissolved solids to a pore fluid density;
      calculating a pressure based on the pore fluid density; and
      generating the pressure profile.

13. The system of claim 12, wherein the computer is further configured to perform operations comprising characterizing each identified porous zone is based on the porosity amount of more than 5%.

14. The system of claim 12, wherein the computer is further configured to perform operations comprising characterizing each identified porous zone is based on the tolerable hole condition between 0 and 40 percent hole enlargement using a caliper log measurement of a hole diameter.

15. The system of claim 12, wherein converting the measured resistivity values to salinity values for each of the plurality of porous zones further comprises transforming resistivity logs to formation water salinity values using Pickett plots.

16. The system of claim 15, wherein transforming comprises the Pickett plots being part of the transform process from the resistivity logs to the pore fluid density.

17. The system of claim 16, wherein the transforming further comprises calibrating the transformed resistivity logs to the pore fluid density using available pressure gradients or fluid sample analysis.

18. The system of claim 12, wherein converting the amount of total dissolved solids to a pore fluid density profile further comprises calculating using an analytical model.

19. The system of claim 18, wherein calculating using an analytical model includes a density (g/cubic cm)=1+TDS (ppm)*6.95E-07.

20. The system of claim 12, wherein generating the pressure profile further comprises generating an estimate of over-pressure or under-pressure for a drilled well.

* * * * *